United States Patent [19]

Beveridge et al.

[11] 4,182,404
[45] Jan. 8, 1980

[54] RADIATOR TOP TANK WITH PLURAL SUMP LINES

[75] Inventors: Paul J. Beveridge; Myron L. Vigesaa, both of Springfield, Ill.

[73] Assignee: Fiat-Allis Construction Machinery, Inc., Deerfield, Ill.

[21] Appl. No.: 864,726

[22] Filed: Dec. 27, 1977

[51] Int. Cl.² .................. F01P 3/18; F01P 7/14; F28F 9/22
[52] U.S. Cl. ...................... 165/41; 123/41.49; 123/41.54; 165/107; 165/108; 165/114; 165/137; 165/139; 165/174; 165/DIG. 24
[58] Field of Search .......... 180/54 A; 165/107, 137, 165/107 D, 41, 44, 51, 108, 110, 110 D, 111, 113, 114, 174, 103, 139; 123/41.48, 41.49, 41.54; 137/38, 44

[56] References Cited

U.S. PATENT DOCUMENTS

| | | | |
|---|---|---|---|
| 1,659,367 | 2/1928 | Lamblin | 123/41.48 |
| 1,690,841 | 11/1928 | Rushmore | 123/41.54 |
| 2,332,007 | 10/1943 | Parker | 137/44 |
| 2,357,626 | 9/1944 | Arnold | 123/41.54 |
| 2,628,079 | 2/1953 | Haynes et al. | 165/110 |
| 3,096,818 | 7/1963 | Evans et al. | 165/111 |
| 3,254,707 | 6/1966 | Ferguson | 165/110 |
| 3,282,333 | 11/1966 | Jensen | 165/111 |
| 3,604,502 | 9/1971 | Morse et al. | 165/110 |
| 3,769,947 | 11/1973 | Crain | 165/137 |
| 3,782,451 | 1/1974 | Cates | 165/103 |
| 3,989,103 | 11/1976 | Cieszko | 165/110 |
| 4,061,187 | 12/1977 | Rajasekaran | 165/107 |

Primary Examiner—Sheldon J. Richter
Attorney, Agent, or Firm—August E. Roehrig, Jr.; Robert A. Brown; Harvey W. Rockwell

[57] ABSTRACT

An engine cooling system for the internal combustion engine of a motor vehicle, such as a construction machine or the like which operates on uneven or sloped terrain, comprises a radiator having a lower core section and an elongated upper section or top tank separated from the core section by a sealed baffle and extending transversely to the longitudinal axis of the vehicle. The cooling system further comprises fluid conducting passages connected between the radiator and the engine, including a radiator supply line and a radiator return line connected between the core section and the engine. The cooling system also comprises a pair of fluid outlet ports located near the bottom of the top tank and spaced apart from each other in a direction transverse to the longitudinal axis of the vehicle. The cooling system also comprises a pair of sump or make-up lines, each connected between an inlet port in the radiator return line and an outlet port of the top tank to enable a faster fill rate and full use of the top tank's fluid capacity, especially in slope operations of the vehicle when the top tank is tilted toward one end or the other.

9 Claims, 7 Drawing Figures

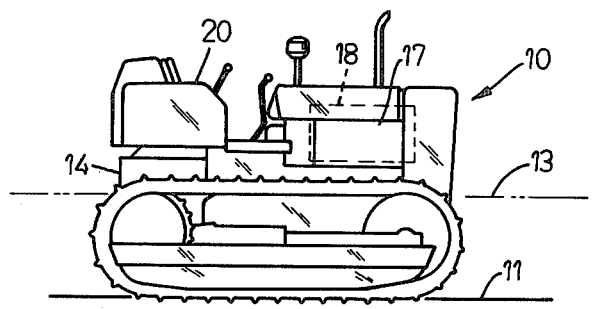
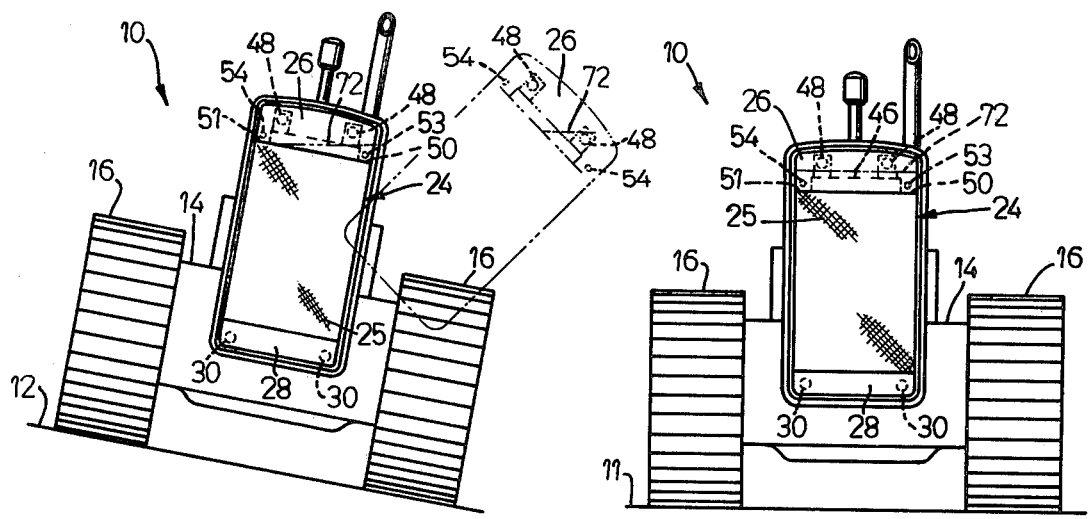
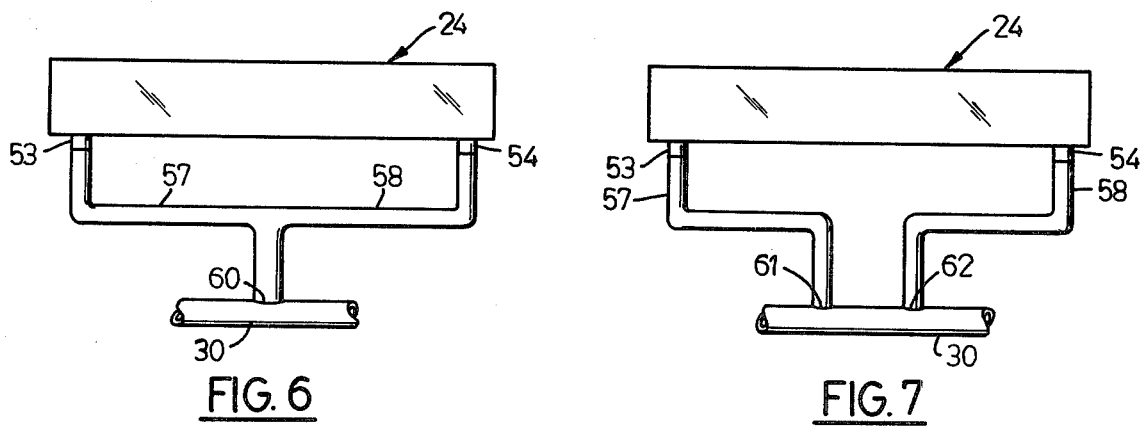

RADIATOR TOP TANK WITH PLURAL SUMP LINES

BACKGROUND OF THE INVENTION

Field of Use

This invention relates generally to engine cooling systems for the internal combustion engines of motor vehicles. In particular, it relates to such systems which comprise a radiator having a core section and a top tank from which fluid coolant is supplied for circulation between the engine and the radiator core section.

Description of the Prior Art

Some prior art engine cooling systems for the internal combustion engine of motor vehicles, such as construction machines or the like, which operate on uneven or sloped terrain, comprise a radiator having a lower core section and a top tank mounted on but separated from the core section by a sealed baffle. The cooling system further comprises fluid conducting passages connected between the radiator and the engine, including a radiator supply line and a radiator return line connected between the core section and the engine, and a sump or make-up line connected between a fluid inlet port in the radiator return line and a fluid outlet port at a location near the lower mid-point of the top tank. During operation of the cooling system when the vehicle is on level terrain, fluid available in the top tank normally flows under the force of gravity from the fluid outlet port in the top tank through the sump line to the fluid inlet port in the radiator return line. However, during operation of the cooling system when the vehicle is on sloped terrain and the top tank is tilted, the fluid level in the top tank may fall below the fluid outlet port. This results in less than all of the fluid in the top tank being available as make-up or draw-down fluid for the system, thereby reducing cooling efficiency and risking engine overheating, especially if operation under such conditions is prolonged.

SUMMARY OF THE PRESENT INVENTION

In accordance with the invention, there is provided a system for providing a liquid, such as a coolant fluid, to a component, such as the internal combustion engine of a vehicle, such as a construction machine or the like, which operates on level as well as uneven or sloped terrain. The system comprises a radiator having a lower core section and an elongated upper top tank section separated from the core section by a sealed baffle. The system also comprises a pair of fluid outlet ports located near the bottom of the top tank and spaced apart from each other in a direction transverse to the longitudinal axis of the vehicle. The system further comprises fluid conducting passages connected between the radiator and the engine, including a radiator supply line and a radiator return line connected between the core section and the engine, and conduit means comprising a pair of sump line or fluid make-up lines or conduits, each conduit connected between a fluid inlet port in the radiator return line and a fluid outlet port of the top tank. The system enables a faster fill rate particularly during system initial filling or refilling, as well as during fluid draw-down and full use of the top tank's fluid capacity, especially in slope operations of the vehicle when the top tank is tilted toward one end or the other.

A system in accordance with the invention offers several advantages over prior art arrangements. For example, by using two sump lines connected to opposite ends of the top tank, nearly one hundred percent of the volume of the liquid coolant in the top tank is available for use during draw-down during operation on either level or sloped terrain. Furthermore, when the vehicle cooling system is initially filled, or refilled at regular service intervals, the fill rate and percentage of total system fill is greatly enhanced, provided the sump lines and the fluid inlet ports are of appropriate size. When the vehicle is operating on sloped terrain and the liquid in the top tank flows to one end thereof, all of the liquid is available for draw-down since the liquid is always in communication with one or the other sump lines. An engine cooling system in accordance with the invention can be easily provided by making relatively simple modifications to existing prior art cooling systems and equipment, as by replacing the single centrally located liquid inlet port in the top tank with a plurality of inlet ports and sump lines in accordance with the present invention. Furthermore, the inlet ports in the top tank can be located at various positions near the lower lateral ends of the top tank. Also, the sump lines could be routed in a manner other than that disclosed herein and, if desired, the outlet ports to which the sump lines are connected, can be located not only in the radiator return line, but at the inlet side of the water pump, at the bottom of the core section of the radiator, or at other suitable locations. Although only two sump lines and two tank outlet ports in accordance with the invention are shown in the embodiments disclosed herein, more could be employed. Furthermore, two or more sump lines can be independently connected to individual inlet ports at appropriate locations, or the lines could be connected together to a common manifold and thence to a single inlet port. In addition, the invention is applicable not only to engine cooling systems but could be applied to other types of systems employing tank containing liquid to be supplied to a component and mounted on a vehicle intended for operation on sloped terrain. Other objects and advantages of the invention will hereinafter appear.

BRIEF DESCRIPTION OF THE DRAWINGS

FIG. 1 is a side elevational view of a vehicle such as a tractor employing an engine cooling system in accordance with the present invention;

FIG. 2 is a front elevational view of the vehicle shown in FIG. 1;

FIG. 3 is a view similar to FIG. 2 but showing the vehicle operating on sloped terrain;

FIG. 6 is a schematic view showing a portion of the cooling system of FIG. 4; and FIG. 7 is a schematic view showing another embodiment of the portion of the cooling system shown in FIG. 6.

DESCRIPTION OF PREFERRED EMBODIMENTS

Figure 5:
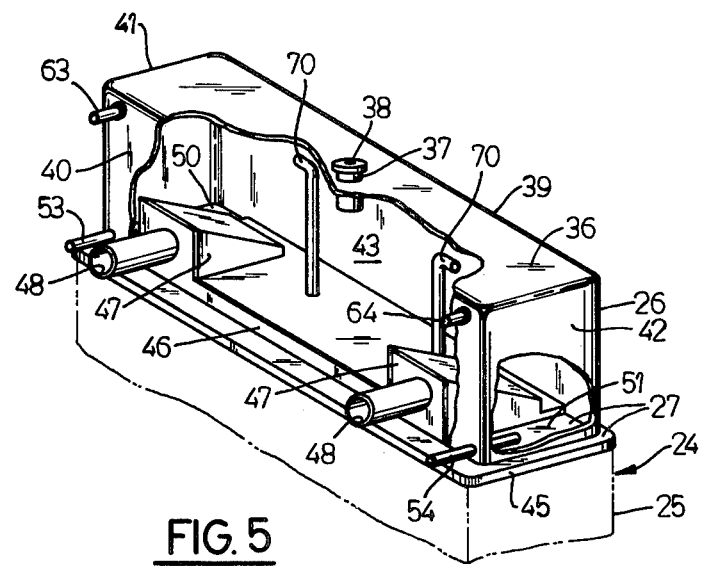
FIG. 5 is an enlarged perspective view in schematic form of the radiator top tank shown in FIG. 4.

Referring to FIGS. 1, 2, and 3, the numeral 10 designates a construction machinery vehicle, such as a tractor, which is shown in FIGS. 1 and 2 on level terrain 11 and in FIG. 3 on sloped terrain 12 whereby the tractor is tilted about its longitudinal axis 13.

Tractor 10 comprises a main frame 14 on which are mounted a pair of laterally spaced apart ground-engaging crawler tracks 16 for propelling the tractor in forward and reverse directions and to enable steering thereof; an engine compartment 17 which houses an internal combustion engine 18 for driving the crawler tracks 16 and other tractor components and which also houses an engine-cooling system in accordance with the invention; and a tractor operator's station 20.

Figure 4:
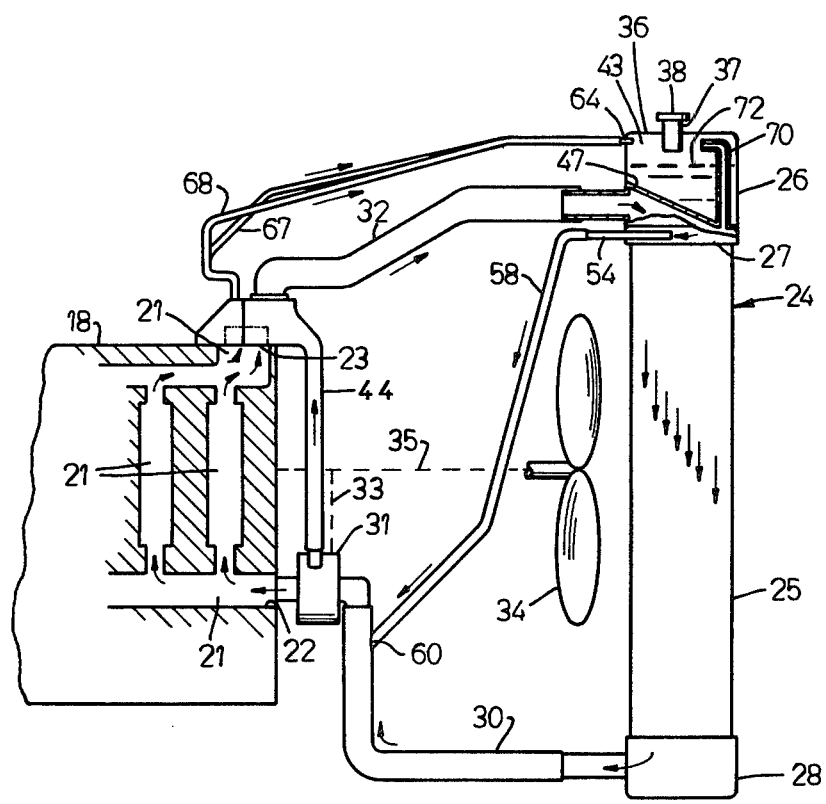
FIG. 4 is an enlarged side elevational schematic view of the engine cooling system employed in the vehicle shown in FIGS. 1, 2, and 3.

Referring to FIGS. 4 and 5, the engine cooling system in accordance with the invention is understood to contain and circulate a fluid coolant and it is to be understood that during operation the coolant is principally in a liquid phase. The cooling system comprises coolant passages 21 in engine 18 which terminates in a fluid inlet passage 22 and a fluid outlet passage 23 on the engine. The system also comprises a radiator 24 which includes a lower core section 25 of conventional construction and an upper section or top tank 26, hereinafter described in detail, which is physically mounted on the core section but separated therefrom by a sealing member or baffle 27. A reservoir 28 is located at and attached to the bottom of core section 25 for collecting coolant from the core section. One or more (usually one) radiator return lines 30 are connected between radiator reservoir 28 and fluid inlet passage 22 of engine 18. A conventional pump 31 for circulating fluid is located in the radiator return line(s) 30 and is driven by engine 18 through conventional means indicated by the dotted line 33. A fan 34 adjacent core section 25 is also driven by engine 18 through conventional means indicated by the dotted line 35.

As FIGS. 4 and 5 show, top tank 26, which is elongated in form, comprises a bottom wall defined by baffle 27, a top wall 36 having a fill pipe 37 with a removable vented radiator fill cap 38 therein, a front wall 39, a rear wall 40, and opposite end walls 41 and 42. The walls define a deaerating chamber 43. The baffle 27 is attached and sealed as by welding completely around its periphery to the walls of the top tank 26, and includes a raised intermediate portion 46 to which one or two spaced apart housing(s) 47 are attached. The interior of each housing 47 is in communication with the core section 25 of the radiator 24 and each housing is provided with a fluid inlet port 48 which is in communication with the interior of the housing and, thus, the core section 25 of the radiator. At least one radiator supply line 32 is connected between each port 48 and the fluid outlet passage 23 of engine 18. A by-pass line 44 is connected between the fluid outlet passage 23 of engine 18 and the radiator return line 30.

The extreme ends of baffle 27 cooperate with the walls of tank 26 to define wells 50 and 51 at the bottom of the extreme ends of tank chamber 43. The wells 50 and 51 are provided with fluid outlet ports 53 and 54, respectively, which, in this example, take the form of tubes which extend through rear wall 40 of tank 26 into tank chamber 43 and into the wells but are not limited to the particular forms disclosed. The ports 53 and 54 are spaced apart from each other in a direction which is transverse to the longitudinal axis of tractor 10. A pair of sump lines or fluid make-up lines 57 and 58 are provided. As FIG. 6 shows, line 57 is connected between the fluid outlet port 53 and a fluid inlet port 60 in the radiator return line 30. FIG. 6 also shows that line 58 is connected between the fluid outlet port 54 and the fluid inlet port 60. If preferred, as shown in FIG. 7, the sump lines 57 and 58 could be connected to separate fluid inlet ports 61 and 62, respectively, in the radiator return line 30.

The top tank 26 is provided with one or more fluid inlet or vent ports 63 and 64, respectively, which take the form of tubes which extend through rear wall 40 of tank 26 into tank chamber 43 near the top thereof. The ports 63 and 64 are spaced apart from each other in a direction which is transverse to the longitudinal axis of tractor 10. One or more vent lines 67 and 68 are provided. As FIG. 4 shows, line 67 is connected between the vent port 63 and fluid outlet passage 23 of engine 18. It is to be understood that line 68 is also connected between the fluid outlet port 64 and the fluid outlet passage 23.

A pair of stand pipes 70 are supported within top tank 26 and communicate between the core section 25 of radiator 24 and the de-aerating chamber 43 of the top tank.

Operation

The engine-cooling system in accordance with the invention is employed and operates as follows. Liquid coolant is poured into the cooling system through the radiator fill pipe 37 into the deaerating chamber 43 of the radiator top tank 26. The coolant flows out of the chamber 43 of the top tank 26 into the two sump lines 57 and 58, then into the radiator return line 30. From radiator return line 30, the coolant flows simultaneously through fluid inlet passage 22 into the coolant passages 21 of the engine 18, and also into the reservoir 28 and then into the radiator core section 25. As the coolant fills the engine conduit passages 21, air escapes through the vent lines 67 and 68 into the top tank 26 and out through the filler neck 37 to the atmosphere. As coolant fills the radiator core section 25, air escapes through the standpipes 70 into the chamber 43 of top tank 26 and out through the filler pipe 37 to the atmosphere. After the engine coolant passages 21 and the radiator core section 25 are filled, the radiator top tank 26 is filled to a predetermined level 72, as shown in FIGS. 2 and 4.

When the engine 18 is operating, coolant is pumped by pump 31 through the engine coolant passages 21 from the radiator return line 30. The coolant receives heat from the engine 18, and about 95 percent of the coolant leaves the engine via the radiator supply lines 32. Coolant then enters the housings 47 in top tank 26 and passes therethrough into core section 25 and heat is dissipated therefrom as it flows through the radiator core section 25 into the radiator return line 30 and the cycle is repeated. The other 5 percent of the coolant leaves fluid outlet passage 23 located at the highest point of the engine 18 and flows through the vent lines 67 and 68 into the top tank 26 and into the relatively calm chamber 43 above the baffle 27 wherein any air that may be entrained in the coolant is separated from the coolant.

As FIGS. 1 and 2 show, in operations on a level slope (or in fore and aft slope operations), the coolant flows into both wells 50 and 51, through the outlet ports 53 and 54, respectively, and through the sump lines 57 and 58, respectively, into the radiator return line 30. As FIG. 3 makes clear, on side slope operations, the coolant may flow into either one of the wells 50 or 51 into corresponding outlet port 53 or 54, through the corresponding sump line 57 or 58 and into the radiator return line 30 and the cycle is repeated. In FIG. 3, tank 26 is shown in solid lines on a 10° slope and is shown in phantom lines on a 45° slope, for example.

It is important to the operation of the invention that the sump lines 57 and 58 be connected to the fluid inlet port 60, or ports 61, 62 at a point substantially below the predetermined fluid level 72. This requirement is preferred because whenever a vehicle is oriented on terrain in a slope attitude as much as 45° from the horizontal, one or the other of outlet ports 53 or 54 may be exposed to air above the fluid level 72. In this condition, with an outlet port, for example 54, exposed to air, the resultant mixture of gas and fluid in well 51 brings about a change in flow in sump line 58. Simultaneously, fluid outlet port 53 remains flooded with fluid that flows through sump line 57 through line 30 to the engine, coolant passages 21. It will be seen that a venturi effect is created at the juncture of fluid inlet ports 60, or 61, 62 with line 30. The venturi effect tends to cause a drop in fluid level in sump line 58. At the same time, the level of fluid above outlet port 53 results in a pressure differential of greater head than the level of fluid in line 58. In the event the fluid level in sump line 57 would be lowered below its juncture with line 30, flow of fluid between radiator 24 and engine 17 would be seriously restricted with resultant overheating of the engine. Accordingly, connection of sump lines 57 and 58 to fluid inlet port 60, or ports 61 and 62 at a juncture substantially below predetermined fluid level 72 ensures that the fluid level in either sump line 57 or 58 will remain sufficiently above the juncture of line 30 with inlet port 60, or ports 61 and 62 so that engine 17 receives constantly a sufficient flow of coolant to prevent its overheating.

It is known that the construction machinery industry finds acceptable design criteria of 45° maximum side slope attitude for operation of crawler tractors. In actual practice it is not uncommon for the fluid level 72, at a 45° slope, to be below one or the other of the fluid outlet ports 53 or 54. Therefore, the sump line 57 or 58 which is not exposed to air will still effectively supply fluid make-up to the engine 17 without introduction of air. The importance of the invention will be further understood when considering the fact that prior art systems comprise a single sump line connected to the top tank midway between the ends thereof. In the prior art, since only one sump line has been provided, exposure of its inlet port to air above the fluid level when a vehicle is sloped from horizontal results in air being drawn into the engine resulting in inefficient heat transfer of engine heat to the coolant fluid. The present invention overcomes this deficiency be providing at least two sump lines wherein at least one, for example 53, of the fluid inlet ports of the top tank 26 is below the fluid level 72 and is constantly flooded. Further, the fluid outlet port that is not exposed to air is located sufficiently above the inlet port 60, or ports 61, 62 so that gravity acting on the fluid therein will assist in causing the fluid to pass from the top tank 26 to join fluid from return line 30 and flow into the engine 18. This action thereby assures that air or gaseous vapor bubbles that may have formed by passage of coolant through the engine 17 and have passed through vent lines 67 and 68 to the top tank 26 after being separated from the fluid are not returned to the engine.

Having thus described preferred embodiments, the present invention is seen to provide a novel radiator top tank with plural sump lines having utility in combination with an engine cooling system. Several advantages and characteristics including those apparent from the foregoing description and others are inherent in the invention. It is anticipated that changes and modifications to the described form of the engine cooling system will occur to those skilled in the art and that such changes and modifications may be made without departing from the spirit of the invention or the scope of the appended claims.

We claim:

1. A cooling system for use with a vehicle operating on level and sloped surfaces comprising:
   a radiator for circulating liquid coolant to an engine of a vehicle,
   said radiator having a core section and a top tank,
   coolant return means operatively coupled to the core section for directing coolant to a coolant outlet of an engine,
   radiator fill means operatively coupled to the core section for receiving coolant from a coolant outlet of an engine,
   said top tank having a pair of spaced outlet ports and an inlet port,
   conduit means coupled between said spaced outlet ports and the coolant return means to direct coolant from at least one of the outlet ports to the coolant return means to maintain flow of coolant to the coolant inlet of an engine of a vehicle during operation on level and inclined surfaces.

2. The system of claim 1 wherein the conduit means comprises a pair of conduits.

3. A system of claim 1 further including vent conduit means in fluid communication with the top tank and adapted to be coupled to a coolant outlet of an engine to supply coolant to the top tank.

4. The system of claim 1 wherein the pair of spaced ports are positioned to maintain at least one port in fluid communication with coolant in the top tank in a plurality of angular orientations of the radiator during operation of a vehicle on level and sloped surfaces.

5. A radiator system to supply coolant to an engine of a vehicle which operates for movement along an axis on level and sloped surfaces comprising:
   a radiator adapted to be coupled to an engine of a vehicle and having a core section and a top tank;
   a radiator return line connected between said core section and a fluid inlet passage on the engine;
   a radiator fill line connected between said core section and a fluid outlet passage on the engine;
   said top tank having a pair of outlet ports spaced apart from each other in a direction transverse to the axis of movement of a vehicle, said top tank also having an inlet port;
   conduit means including make-up lines connected between said pair of outlet ports of said top tank and a fluid inlet passage on the engine;
   and a vent line connected between a fluid outlet passage on the engine and said inlet port on said top tank.

6. A system according to claim 5 wherein said conduit means comprises a pair of make-up lines, each of said make-up lines being connected between one of said outlet ports on a top tank and said fluid inlet passage on the engine.

7. A system according to claim 6 wherein said outlet ports on said top tank are located near the bottom of said tank.

8. A system according to claim 7 wherein said top tank encloses a chamber which includes a pair of wells at the bottom of said tank, said wells being spaced apart from each other in a direction transverse to the axis of movement of a vehicle, each of said wells being in direct communication with one of said outlet ports on said top tank.

9. A system according to claim 8 wherein said top tank includes a fill port and a radiator cap therefor, and at least one standpipe communicating between said core section of said radiator and said chamber of said tank.

* * * * *